United States Patent [19]
Kobayashi et al.

[11] 3,825,731
[45] July 23, 1974

[54] NUMERICAL CONTROL SYSTEM

[75] Inventors: Kengo Kobayashi, Kawasaki; Mitsuo Manabe, Tokyo; Shinichi Isobe, Kawasaki, all of Japan

[73] Assignee: Fujitsu Limited, Kawasaki-shi, Japan

[22] Filed: Jan. 5, 1973

[21] Appl. No.: 321,363

Related U.S. Application Data

[63] Continuation-in-part of Ser. No. 104,086, Jan. 5, 1971, abandoned.

[30] Foreign Application Priority Data
Jan. 30, 1970  Japan.................................. 45-7958

[52] U.S. Cl.............. 235/151.11, 318/569, 318/570
[51] Int. Cl............................................ G06f 15/46
[58] Field of Search ....... 235/151.11; 318/569, 570, 318/573, 600, 601

[56] References Cited
UNITED STATES PATENTS
3,246,125   4/1966   Mergler ..................... 235/151.11 X
3,284,618   11/1966  Gotz et al. ..................... 318/569 X
3,416,056   12/1968  Motooka et al. .......... 235/151.11 X
3,417,303   12/1968  Reuteler ............................ 318/570
3,439,346   4/1969   McGee ...................... 235/151.11 X
3,602,700   8/1971   Jerua et al. ................ 235/151.11 X
3,634,662   1/1972   Slawson ........................ 235/151.11

*Primary Examiner*—Felix D. Gruber
*Assistant Examiner*—Jerry Smith
*Attorney, Agent, or Firm*—Robert E. Burns; Emmanuel J. Lobato; Bruce L. Adams

[57] ABSTRACT

In the numerical control mode of the present invention, an incremental command and an absolute command are used together within a single block, thereby simplification of the programming process and extreme preciseness in the numerical control system being achieved.

3 Claims, 30 Drawing Figures

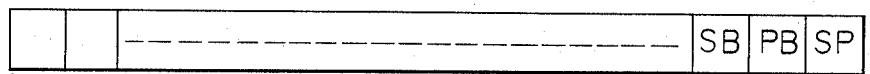

Fig. 10A

CLOCK PULSE

Fig. 10B

2-PHASE RING COUNTER (QUARTERNARY COUNTER)

Fig. 10C

3-PHASE RING COUNTER (SENARY COUNTER)

| | CONTENTS OF ARITHMETIC OPERATION | OPERATION COMMAND | CONTENTS OF ARITHMETIC OPERATION EXPRESSED BY THE NOTATION OF REGISTER |
|---|---|---|---|
| READ IN (RD) (BCD → A BINARY NUMBER) | | J01 | $(B) \times 5 \rightarrow C$ |
| | | J02 | $(B) \times 2 + (-1)^{SNN} (RN) \rightarrow C$ |
| | | J03 | $(R3) \rightarrow B, \quad (C) \rightarrow R3$ |
| | | J04 | $(R4) \rightarrow B, \quad (C) \rightarrow R4$ |
| | | J05 | $(R5) \rightarrow B, \quad (C) \rightarrow R5$ |
| | | J06 | $(R6) \rightarrow B, \quad (C) \rightarrow R6$ |
| | | J07 | $(R7) \rightarrow B, \quad (C) \rightarrow R7$ |
| | | J08 | $(R8) \rightarrow B, \quad (C) \rightarrow R8$ |
| | | J09 | $(RF) \rightarrow B, \quad (C) \rightarrow RF$ |
| PRE-PROCESSING OPERATION (PR) | $X_n = u + X_o$ | J10 | $(R1) + (R3) \rightarrow R1$ |
| | $Z_n = w + Z_o$ | J11 | $(R2) + (R4) \rightarrow R2$ |
| | $u = x - X$ | J12 | $(R3) - (R1) \rightarrow R3$ |
| | $w = z - Z$ | J13 | $(R4) - (R2) \rightarrow R4$ |
| | $U = u' + (-t_o x)$ or $(-i)$ | J14 | $(R3) + (R5) \rightarrow R3$ |
| | $W = w' + (-t_o z)$ or $(-k)$ | J15 | $(R4) + (R6) \rightarrow R4$ |
| | $u' = u + t_n x$ | J16 | $(R3) + (R7) \rightarrow R3$ |
| | $w' = w + t_n z$ | J17 | $(R4) + (R8) \rightarrow R4$ |
| CLEAR (CLR) | | J23 | $0 \rightarrow R5 \,\&\, R6$ |
| | | J24 | $0 \rightarrow R7 \,\&\, R8$ |
| DISTRIBUTION OPERATION (DIS) | $H_{ij} + (-1)^{SNW} \cdot U \rightarrow H_{ij+1}$ | J30 | $(R7) + (-1)^{SNW} (R3) \rightarrow R7$ |
| | $H_{ij} - (-1)^{SNU} \cdot W \rightarrow H_{i+1,j}$ | J31 | $(R7) - (-1)^{SNU} (R4) \rightarrow R7$ |
| | $H_{ij} + 2(-1)^{SNU} \cdot U_{i+1} \rightarrow H_{i+1,j}$ | J32 | $(R7) + 2(-1)^{SNU} (R5) + 1 \rightarrow R7$ |
| | $H_{ij} + 2(-1)^{SNW} \cdot W_{j+1} \rightarrow H_{i,j+1}$ | J33 | $(R7) + 2(-1)^{SNW} (R6) + 1 \rightarrow R7$ |
| | $U_i + (-1)^{SNU} \cdot 1 \rightarrow U_{i+1}, U_i - U = 0?$ | J34 | $(R5) + (-1)^{SNU} \cdot 1 \rightarrow R5, (-1)^{SNU}(R5) - (-1)^{SNU}(R3)$ |
| | $W_j + (-1)^{SNW} \cdot 1 \rightarrow W_{j+1}, W_j - W = 0?$ | J35 | $(R6) + SNW \cdot 1 \rightarrow R6, (-1)^{SNW}(R6) - (-1)^{SNW}(R4)$ |

NUMERICAL CONTROL SYSTEM

DESCRIPTION OF THE INVENTION

The present application is a continuation-in-part of the application Ser. No. 104,086, filed Jan. 5, 1971, and now abandoned.

The present invention relates to a numerical control system wherein both an increment system and absolute system are employed in combination.

There are two principles in the technique of indicating the amount of movement in the numerical control system, one being the increment system wherein the amount of movement is instructed in reference to the actual position of tool within given ordinates and another being the absolute system wherein the position ordinates are instructed within ordinates based on a prescribedly given fixed point as the origin point of the ordinates. Both systems being accompanied by respective merits and demerits, suitable selection has been exerted on both systems in accordance with need in the actual utilization in the conventional numerical control systems.

An object of the present invention resides in the provision of a numerical control system wherein both a word based on the absolute system and a word based on the incremental system can be used together so that programming may be easily accomplished.

The present invention is characterized in that, in a numerical control apparatus wherein the numerical control system is provided with a register for storing the values of the actual tool coordinates, a register for storing the command values and an arithmetic operation circuit for carrying out an arithmetic operation with the assistance by the abovementioned registers, the increment commands are distinguished from the absolute commands by symbols such as alphabets prefixing the numerical values, thusly distinguished commands are written into the above-described prescribed registers and, in the case of the absolute commands, an arithmetic operation is carried out over the difference between the informations stored in both registers so as to acquire the incremental value for performing pulse distribution.

The present invention will be made more apparent from the ensuring description, reference being made to the accompanying drawings, wherein:

FIG. 1A is a schematic view illustrating the construction of a register employed in the arithmetic operation circuit of FIG. 1;

FIGS. 1B through 1E are partial schematic views of various program tapes used in the numerical control system according to the present invention, in which FIGS. 1B and 1C show the tapes having absolute command and incremental command recorded thereon, respectively, and, FIGS. 1D and 1E show the tapes having commands based on both absolute and incremental system, within one block, respectively;

Figure 9:
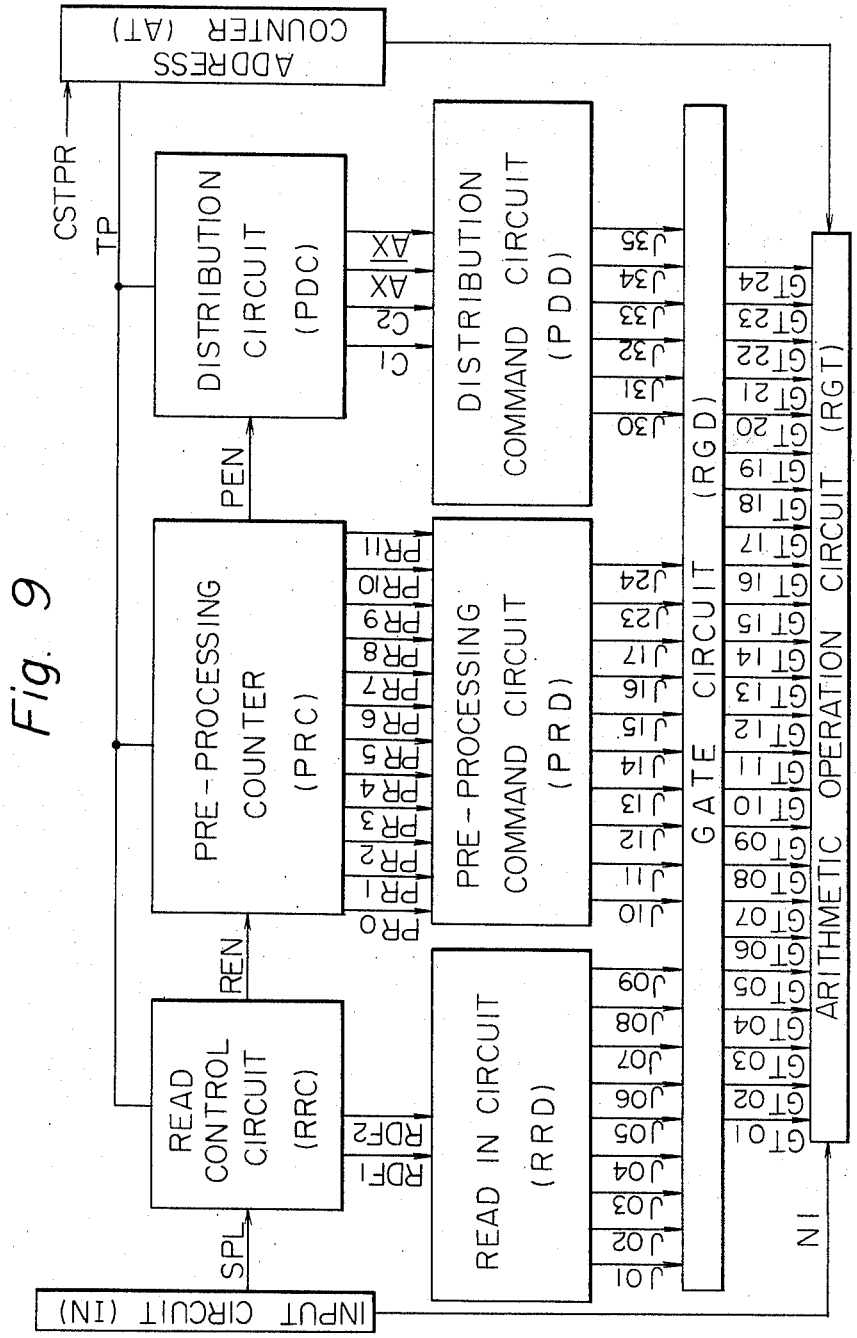
FIG. 9 is a block diagram illustrating the relationship between the pre-processing airthmetic operation function and the other operation function.
Figure 11:
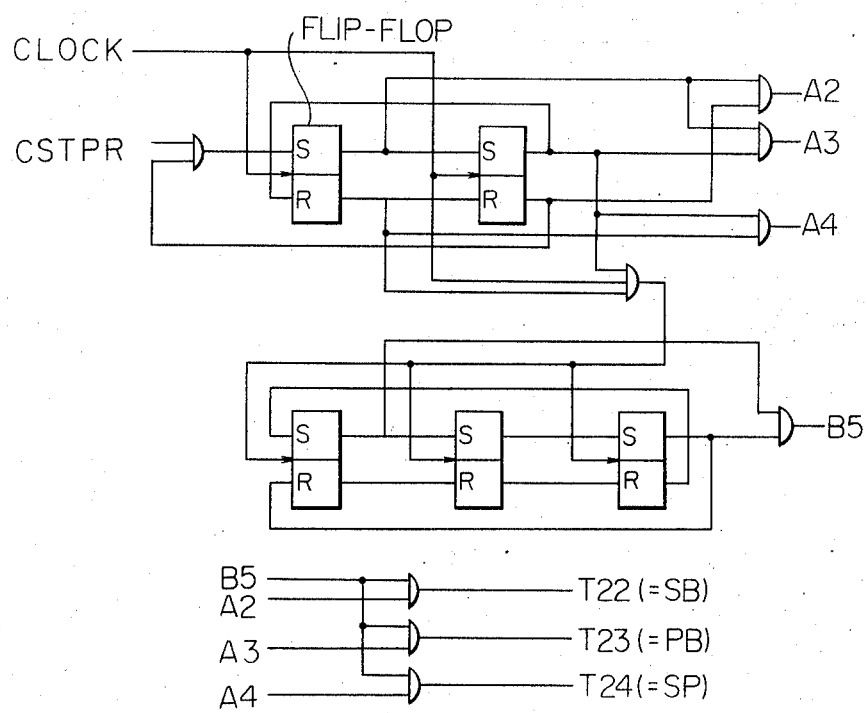
Figure 12:
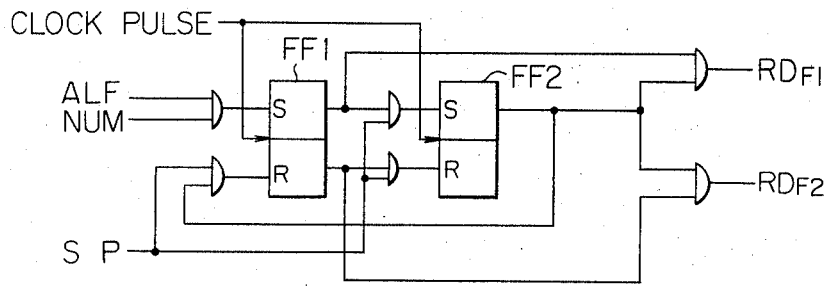
Figure 13:
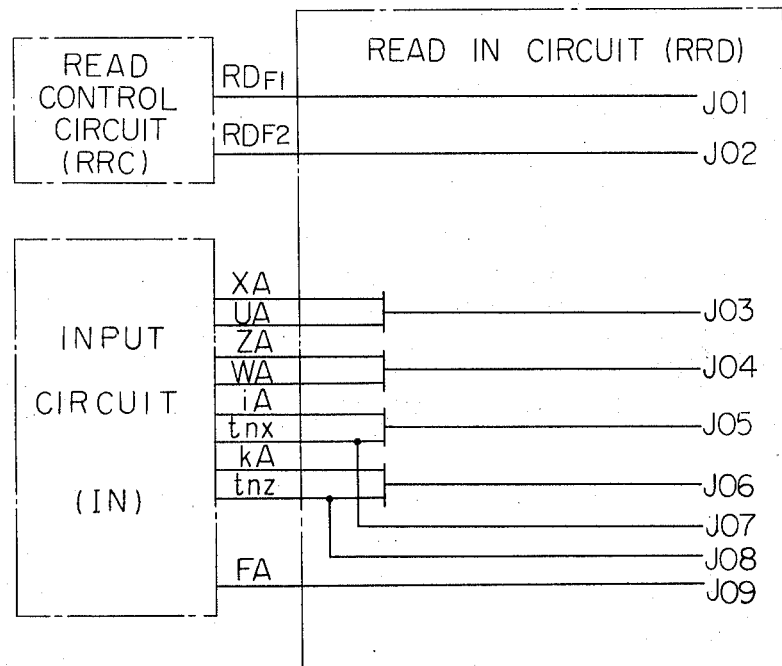
Figure 14:
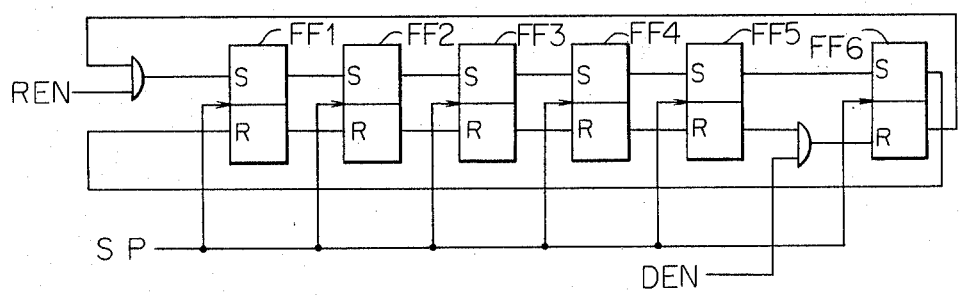
Figure 15:
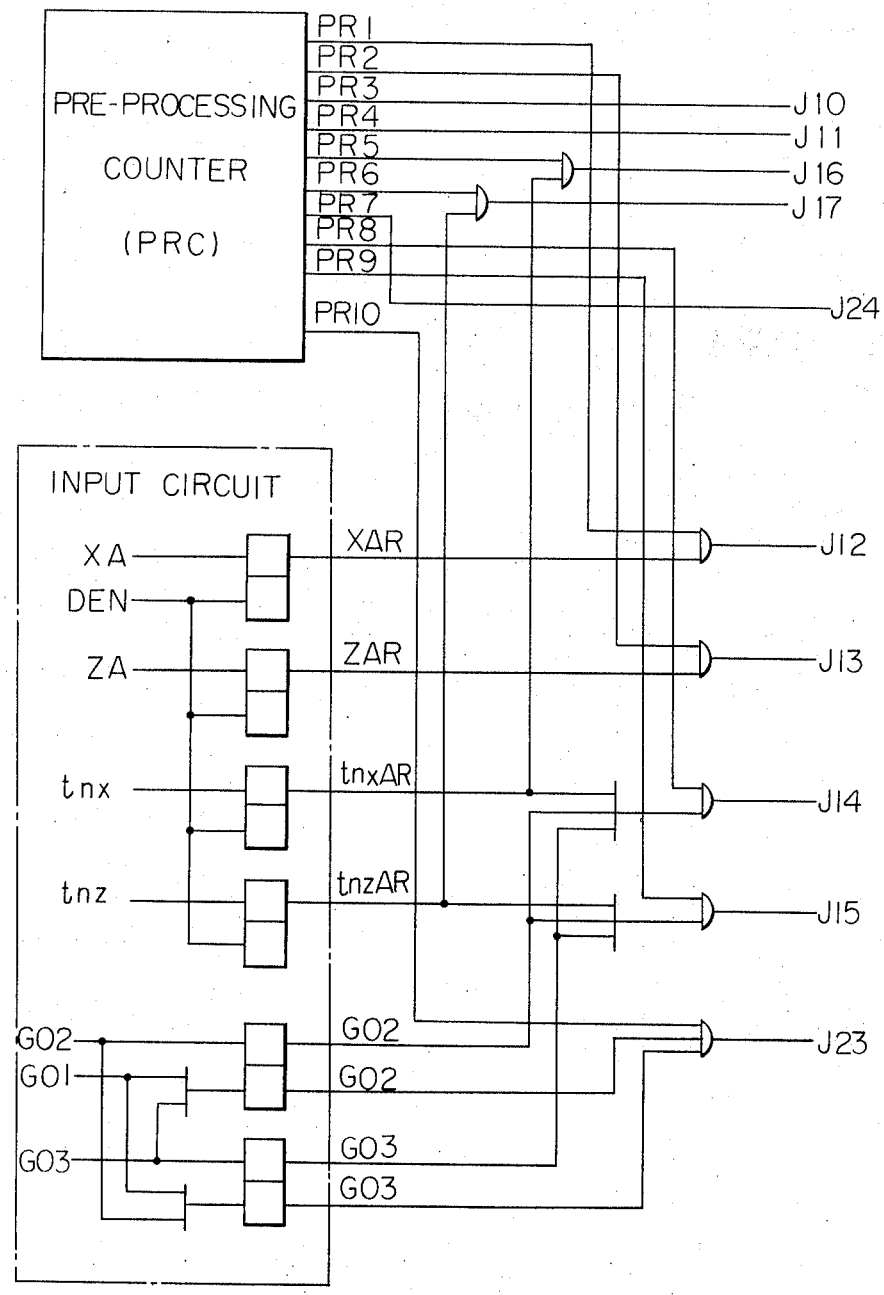
Figure 16A:
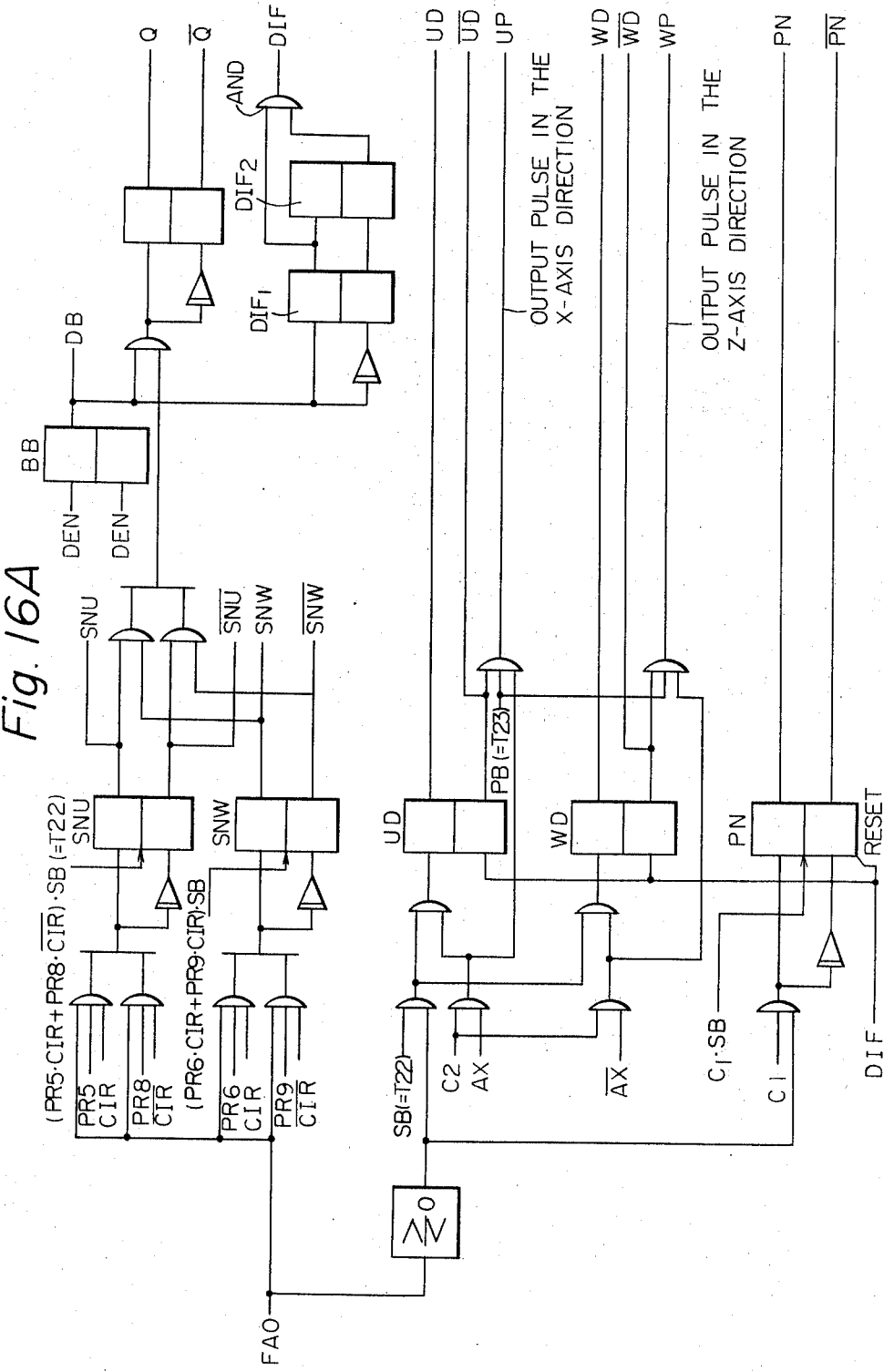
Figure 16B:
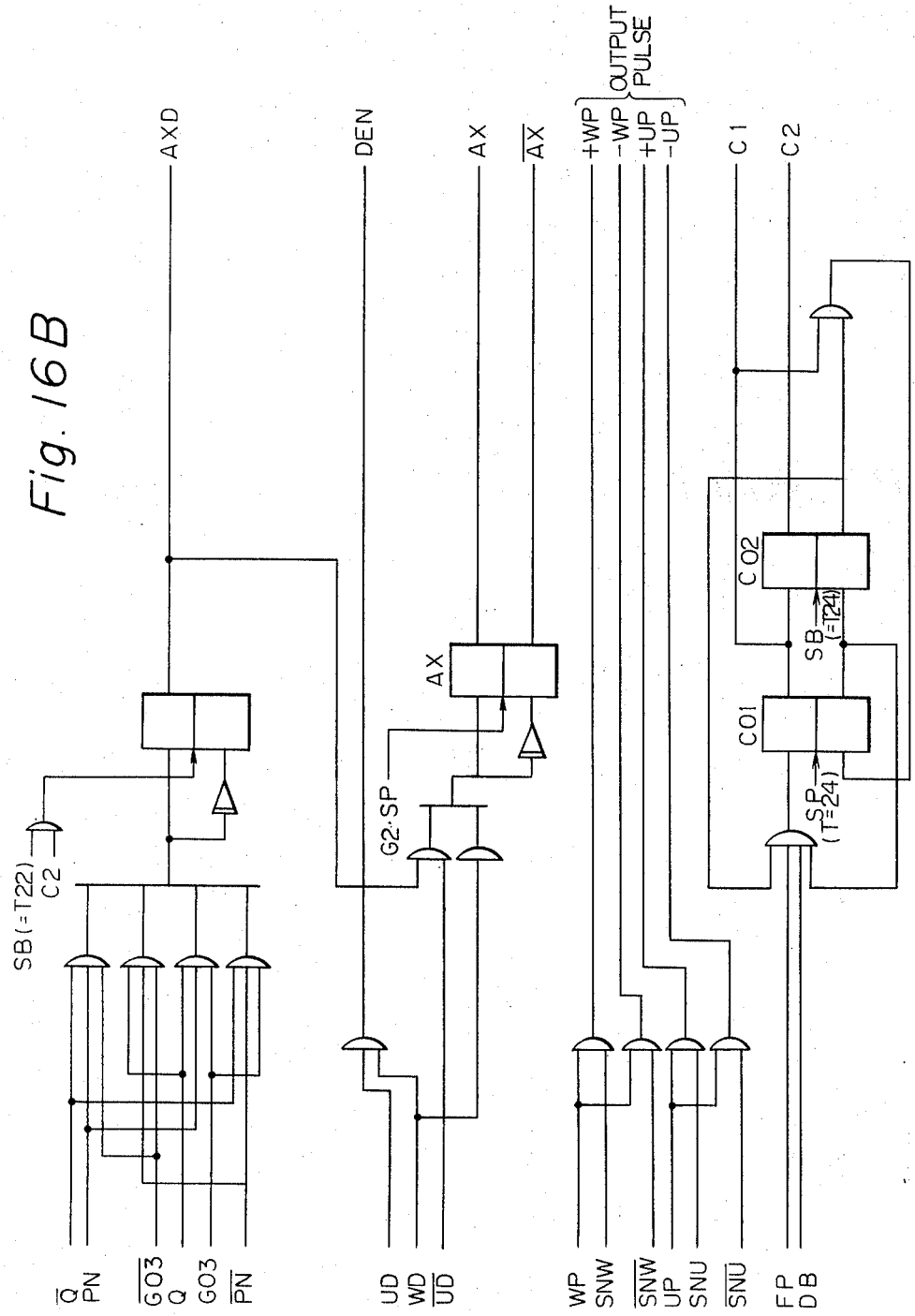
Figure 17:
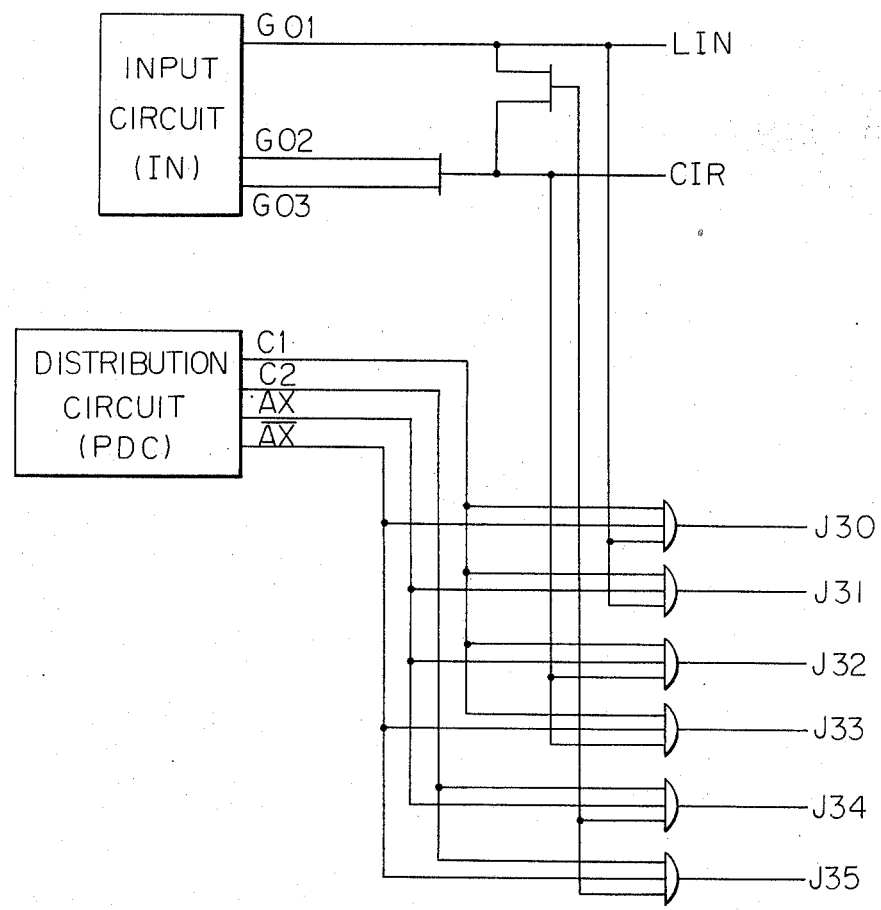
Figure 18:
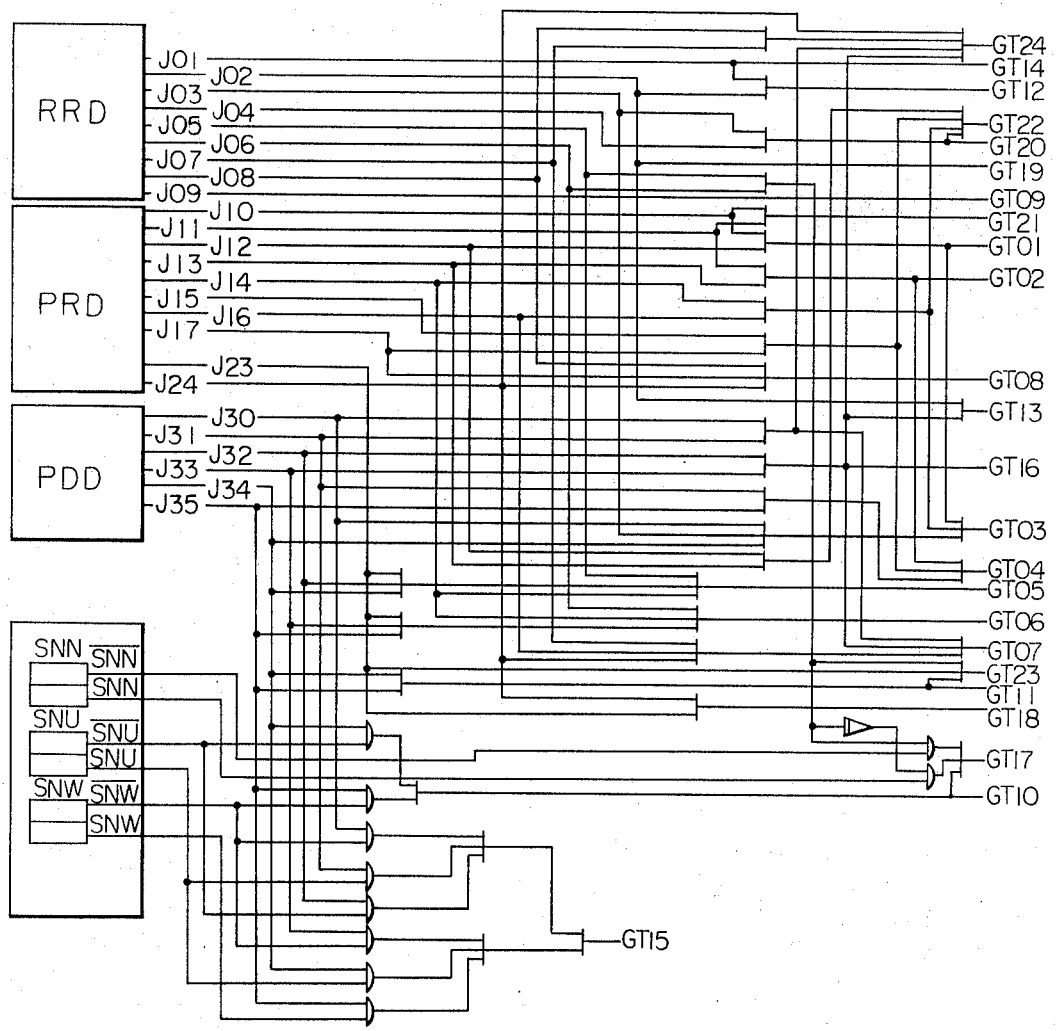

FIGS. 10A thru 10D are waveform diagrams explaining the operation of the address counter AT of FIG. 9;

FIG. 11 is a preferred embodiment of the internal circuit diagram of the address counter AT of FIG. 9;

FIG. 12 is a preferred embodiment of the read control circuit RRC of FIG. 9;

FIG. 13 is a preferred embodiment of the read in circuit RRD of FIG. 9;

FIG. 14 is a preferred embodiment of the pre-processing counter PRC of FIG. 9;

FIG. 15 is a preferred embodiment of the pre-processing command circuit PRD of FIG. 9;

FIGS. 16A and 16B are preferred embodiments of the distribution circuit PDC of FIG. 9;

FIG. 17 is a preferred embodiment of the distribution command circuit PDD of FIG. 9;

FIG. 18 is a preferred embodiment of the gate circuit RGD of FIG. 9;

Figure 19:
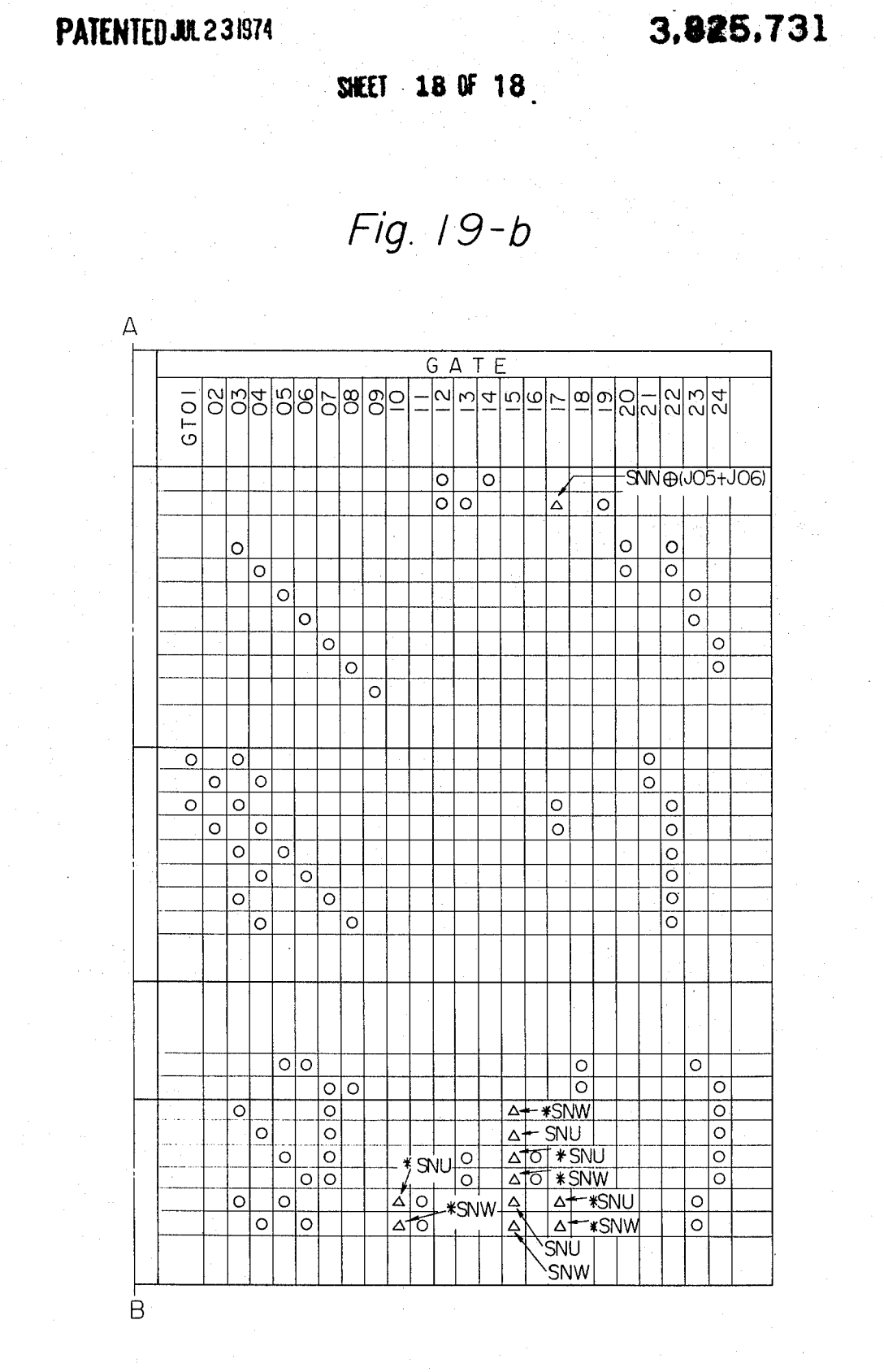

FIG. 19 is a table illustrating correlation between inputs and outputs of the gate circuit RGD of FIG. 9.

Figure 1:
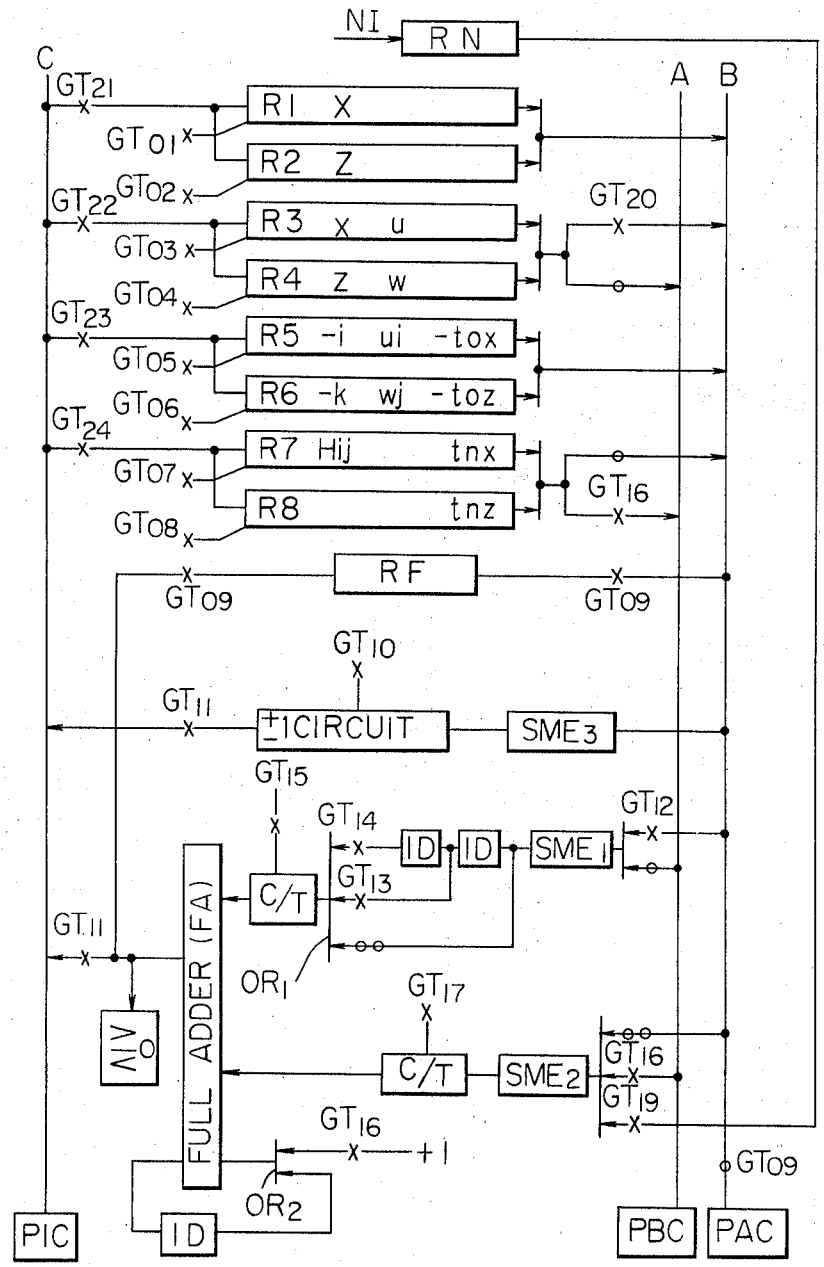
FIG. 1 is a block diagram of the arithmetic operation circuits of the numerical control system according to the present invention.

Referring to FIG. 1, $R_1$ to $R_8$ are registers having 24 bits, respectively, as shown in FIG. 1A. Registers $R_1$ and $R_2$ store the absolute actual positions of tools of a fabricating machine, the registers $R_3$ and $R_4$ store the commands representing the amount of movement of the tool, the registers $R_5$ and $R_6$ store the active value at the time of pulse distribution and the value of an old tool to be compensated, the register $R_7$ stores the X-component of the values of a new tool to be compensated and the discriminating equation for the pulse distribution and, the register $R_8$ stores the Z-component of the values of the new tool to be compensated. RF is a velocity register. GT01 to GT09 designate the gate signals of the above-mentioned respective registers. When the signals GT21 to GT24 become "1," the content of the bus C is written into the register selected by the gate signals GT01 to GT08. GT10 is a signal to be impressed to the ±1 circuit. When the signal GT10 is "1," the ±1 circuit adds −1 to the content of the bus B so as to transmit it to the bus C whereas, when the signal GT10 is "0," it adds +1 to the content of the bus B so as to transmit it to the bus C.

The signals GT15 and GT17 are switching signals of the complemental circuit C/T and, when that signal is "1," the complement of the input numerical value is produced at the output side of the complemental circuit C/T. FA is a full adder, 1D is 1-bit delay circuit, 090 is a plus-minus distinguishing circuit, SME1 to SME3 are flip-flop circuits, PIC is a parity bit insertion circuit connected to the bus C, PAC and PBC are parity check circuits connected to the buses A and B and RN is a parallel-serial converter (numerical value-register).

In the following description, the command information is supposed to be discriminated by the alphabets preceding the relevant numerical values. For example, it is supposed that X and Z are absolute commands, $u$, $w$, $i$, $k$, are incremental commands, $t_{ox}$ and $t_{oz}$ are compensated values of the old tool and $t_{nx}$ and $t_{nz}$ designate compensated values of the new tool. However, it is also feasible to use other alphabets. The parallel-serial converter RN converts the parallel command informations from one record medium, e.g., paper tapes, into serial command informations. The converted serial command informations are once stored in the registers $R_3$ and $R_4$ and thereafter, further converted into values necessary for the pulse distribution. In the following description, a term "pre-processing arithmetic operation function" will refer to the above-mentioned function of converting the absolute or incremental commands into values necessary for the pulse distribution.

This pre-processing operational function will hereinafter be explained in more detail. In this conjunction, it is supposed that the absolute movement command $X_n$ is stored in the register $R_3$ and the register $R_1$ stores the position $X_0$ of the tool prior to the pulse distribution. Then, the necessary incremental amount of movement $u$ is obtained through an arithmetic calculation of $X_n - X_0 = u$. In other words, in the arithmetic calculation between the registers, the process is expressed as $(R_3) - (R_1) \to R_3$. (In this expression, figures within the parenthesis show the respective content of the registers $R_1$ and $R_3$, and $\to R_3$ means to store the result of the arithmetic calculation in the register $R_3$. This illustration will be applied to the later description also.)

Further, the above-mentioned arithmetic calculation will be explained in reference to the block diagram shown in FIG. 1. When the gate signal GT01 is decoded, the content of the register $R_1$ will be made into the complement by passing through the complemental circuit C/T and will be imparted to the full adder FA. Simultaneously, the gate signal GT03 will be decoded and the content of the register $R_3$ will be imparted to the full adder FA. In the full adder FA, both contents imparted will be added to each other. The result of this addition will be writeen into the register $R_3$ through decoding of the gate signal GT22.

Concurrently with the above-mentioned arithmetic operation, the following arithmetic operation will be performed so that the position of the tool after prosecution of the pulse distribution will be stored to the register $R_1$.

$$X_0 + u \to X; (R_3) + (R_1) \to R_1.$$

The above formulae show that, after the contents of the registers $R_1$ and $R_3$ are imparted to the full adder FA to be added by the gate signals GT01 and GT03, the result is written into the register $R_1$ by the gate signal GT21.

Similar arithmetic operations will be carried out relating to the numerical value preceded by the alphabet Z. Further, provided that the command value $w$ of the incremental movement of the tool is stored in the register $R_4$ and the position $Z_0$ of the tool before the pulse distribution is stored in the register $R_2$, the following pre-processing arithmetic operation will be carried out for storing of the position of the tool after pulse distribution in the register $R_2$.

$$Z_0 + w \to Z; (R_2) + (R_4) \to R_2$$

In this case, the operation is omitted regarding the calculation of the incremental amount of the movement.

Figure 2:
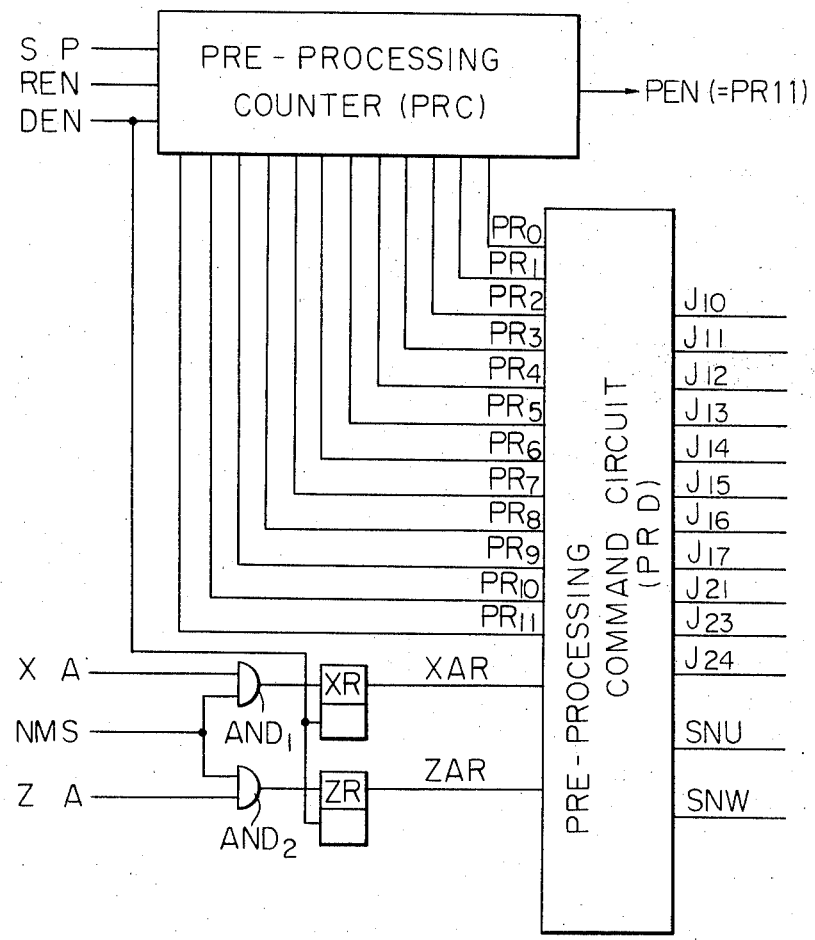
FIG. 2 is a block diagram of the pre-processing arithmetic operation function of the numerical control system according to the present invention.

A detailed explanation of the pre-processing arithmetic operation function will hereinafter be made with reference to the illustration in FIG. 2, wherein REN is a signal to become "1" after the completion of reading, $X_A$ is a signal keeping the value of "1" after reading the alphabet X till the next reading of another alphabet, $Z_A$ is a signal keeping the value of "1" after reading the alphabet Z till the next reading of another alphabet, NMS is a signal which will become the value of "1" when it reads the numerical values, ZR and XR are flip-flops which will become the values of "1" at reading of the numerical values preceded by the alphabets Z and X, SP is the last timing pulse of the operational word, DEN is a signal which becomes the value of "1" after the completion of pulse distribution, PR0 to PR11 are signals for showing the state of the pre-processing counter, J10 to J17, J21, J23 and J24 are operation command signals, respectively, SNU and SNW are signals for showing the pulse distribution directions in the directions of $u(X)$ and $w(Z)$, PEN is a signal which becomes the value of "1" upon completion of the pre-processing arithmetic operation and when the read-in completion signal REN becomes the value of "1," the pre-processing counter PRC is started for commencement of the pre-processing arithmetic operation. The pre-processing counter PRC is composed of six flip-flops and assumes 12 types of states PR0 to PR11, PR0 designating the stationary state of the counter PRC. The state of the counter PRC changes from one to the next when the timing pulse PB becomes the value of "1". The state PR11 changes into the stationary state PR0 when the signal DEN becomes the value of "1" upon completion of the pulse distribution. When the pre-processing counter PRC assumes states other than PR0 and PR11, the address counter AT comes into a function. The flip-flop XR stores the fact that the input information contains an absolute command of X-direction, i.e., the numerical value is preceded by the alphabet X whereas the flip-flop ZR stores the fact that the input information contains an absolute command of Z-direction, i.e., the numerical value is preceded by the alphabet Z. These flip-flops are reset by the signal DEN. The flip-flop (not shown in FIG. 2 and refer to FIG. 16A) issuing the signal SNU stores the positiveness or negativeness of the operational result in the condition PR5 when the command is of circular interpolation and those in the state PR8 when the command is not of circular interpolation. The flip-flop (not shown in FIG. 2 and refer to FIG. 16A) issuing the signal SNW stores the postiveness or negativeness of the operational result in the condition of PR6 when a circular command is given and in the condition PR9 when a non-circle command is given. The mode of operation caused by the pre-processing arithmetic operation function is determined depending upon the states PR1 to PR10, storing states of the flip-flops XR and ZR and the G-function code (preparatory function code) of the input command. The necessary operation is carried out with issue of the operation commands J10 to J17, J21, J23 and J24 from the pre-processing command circuit PRD. Upon completion of the arithmetic operation, the pre-processing counter PRC assumes the state PR11 and a signal PEN is issued from the pre-processing counter PRC.

The correspondence between the conditions of the preprocessing counter PRC, the operation commands and the content of the operation is shown in Table 1. In Table 1, the column of PRC designates the states of the pre-processing counter whereas the column of GT designates the gate signals of the registers $R_1$ to $R_8$.

Table 1

| PRC | OPERATION COMMAND | CONTENTS OF ARITHMETIC OPERATION | | GT |
|---|---|---|---|---|
| PR0 | | NO OPERATION | | |
| PR1 | J12 | $u = x - X_o$ | $(R_3) - (R_1) \rightarrow R_3$ | 01, 03, 22 |
| PR2 | J13 | $w = z - Z_o$ | $(R_3) - (R_2) \rightarrow R_4$ | 02, 04, 22 |
| PR3 | J10 | $X_n = u + X_o$ | $(R_1) + (R_3) \rightarrow R_1$ | 01, 03, 21 |
| PR4 | J11 | $Z_n = w + Z_o$ | $(R_2) + (R_4) \rightarrow R_2$ | 02, 04, 21 |
| PR5 | J16 | $u' = u + t_{ux}$ | $(R_3) + (R_7) \rightarrow R_3$ | 03, 07, 22 |
| PR6 | J17 | $w' = w + t_{nz}$ | $(R_4) + (R_8) \rightarrow R_4$ | 04, 08, 22 |
| PR7 | J24P | | $0 \quad R_7, R_8 \rightarrow$ | |
| PR8 | J14 | $U = u' + (-t_{ux})$ or $(-i)$ | $(R_3) + (R_5) \rightarrow R_3$ | 03, 05, 22 |
| PR9 | J15 | $W = w' + (-t_{uz})$ or $(-k)$ | $(R_4) + (R_6) \rightarrow R_4$ | 04, 06, 22 |
| PR10 | J23 | | $0 \rightarrow R_5, R_6$ | |
| PR11 | | PEN | | |

As is already mentioned, the pre-processing command circuit PRD issues the operation command J12 for carrying out the operation of the incremental amount of the movement $u$, when the numerical value preceded by the alphabet X, i.e., the absolute command is read-in. Thusly issued operation command J12 is impressed to the gate circuit RGD (refer to FIG. 9) so as to carry out the operation by impressing therefrom the gate signals GTO1, GTO3 and GT22, which operate the registers R1 and R3 in the operational circuit shown in FIG. 1, to the arithmetic operation circuit RGT. Concurrently with the abovementioned operation, rewriting of the register R1 is performed so that the register R1 is put in a condition capable of storing the position of the tool after the prosecution of the pulse distribution. This rewriting is carried out through impartation of the gate signals GT01, GT03, and GT21 to the registers R1 and R3 by the operation command J10. In this connection, however, when the numerical value preceded by the alphabetical letter $u$ designating the incremental command is read-in, the former stage of the above-mentioned operation will be effectuated whereas only the later stage of the operation will be carried out. Therefore, even when the abosolute ommand and the incremental command are impressed from block to block, the purposed numerical control can be resulted automatically in accordance with those commands without the need of switching the circuits.

The pulse distribution operation performed after the pre-processing operation will now be briefly explained. As a result of the pre-processing operation, signal lines SNU, SNW of FIG. 2, represent direciton of pulse distributed and the registers store the data in the form suitable for a straight line or an arc.

a. Pulse distribution along a straight line

Figure 3:
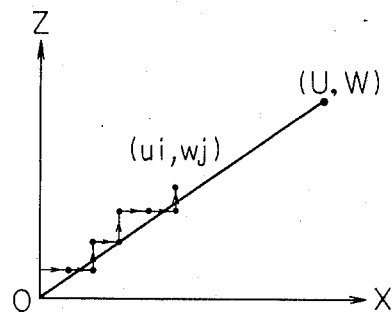
FIGS. 3 and 4 are graphs explaining pulse distribution along a straight line.

When the distribution along a straight line is performed as shown in FIG. 3, the coordinate $U$, $W$ of an end point in the case that a start point is considered as an origin and, the signs SNU, SNW of the coordinates $U$, $W$ of the end point are provided as informations resulting from the pre-processing operation.

Referring to the graph of FIG. 3, the discrimination equation at a point $(ui, wj)$ spaced from the origin (O) by $i$ pulses in the X-axis direction and $j$ pulses in the Z-axis direction may be expressed as follows:

$$H_{ij} = U \cdot wj - W \cdot ui \quad (1)$$

Now, PN, Q and, AXD are defined as follows:

$PN = SN \, H_{ij}$
$Q = \overline{SNU} \; \overline{\oplus} \; SNW$
$AXD = Q \oplus PN$ In the above definitions, $SN \, H_{ij}$ indicates whether the sign of the above-mentioned discrimination equation (1) is positive or negative. This is to say, if the sign is to be negative, it becomes the logical value "1," but if the sign is to be positive, it becomes the logical value "0." Also, the respecitve symbols $\overline{\phantom{x}}$ and $\oplus$ indicate "negation or NOT" and "Exclusive OR." SNU is an output of "set" side of the flip-flop SNU (refer to FIG. 16A). If the flip-flop SNU is set, the output indicates the sign "negativeness" and becomes the logical value "1." SNW is an output of "set" side of the flip-flop SNW (refer to FIG. 16A). If the flip-flop SNW is set, the output indicates the sign "negativeness" and becomes the logical value "1."

The pulse distribution is performed according to the following principle.

i. If $AXD = 0$ and $SNW = 0$, pulses are issued in $+Z$ direction.

ii. If $AXD = 0$ and $SNW = 1$, pulses are issued in $-Z$ direction.

The accompanying computations are then carried out as follows:

$W_{j+1} = W_j + (-1)^{SNW} \cdot 1$; $(-1)^{SNW}$ indicates the value "1" under $SNW = 0$ and also indicates the value "$-1$" under $SNW = 1$.

$H_{ij+1} = H_{ij} + (-1)^{SNW} \cdot U$ $(-1)^{SNW} \cdot wj - (-1)^{SNW} \cdot W = 0?$; If "0" $WD = 1$. That is to say, the flip-flop WD (refer to FIG. 16A) is set.

iii. If $AXD = 1$ and $SNU = 0$, pulses are issued in $+X$ direction.

iv. If $AXD = 1$ and $SNU = 1$, pulses are issued in $-X$ direction.

The accompanying computations are as follows:

$U_{i+1} = ui + (-1)^{SNU} \cdot 1$ $H_{i+1,j} = H_{ij} - (-1)^{SNU} \cdot W$ $(-1)^{SNW} \cdot ui - (-1)^{SNW} \cdot U = 0?$; If "0" $UD = 1$, that is, the flip-flop UD (refer to FIG. 16A) is set.

When the condition of $UD \cdot WD = 1$ is obtained, DEN (DISTRIBUTION END) is set to "1" and the pulse distribution is completed.

Figure 4:
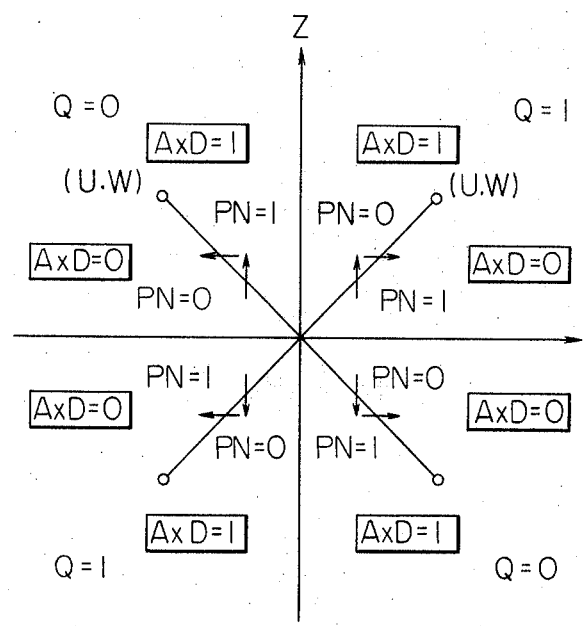

In this connection, FIG. 4 shows Q, PN, AXD and the direction of the pulse distribution.

Figure 5:
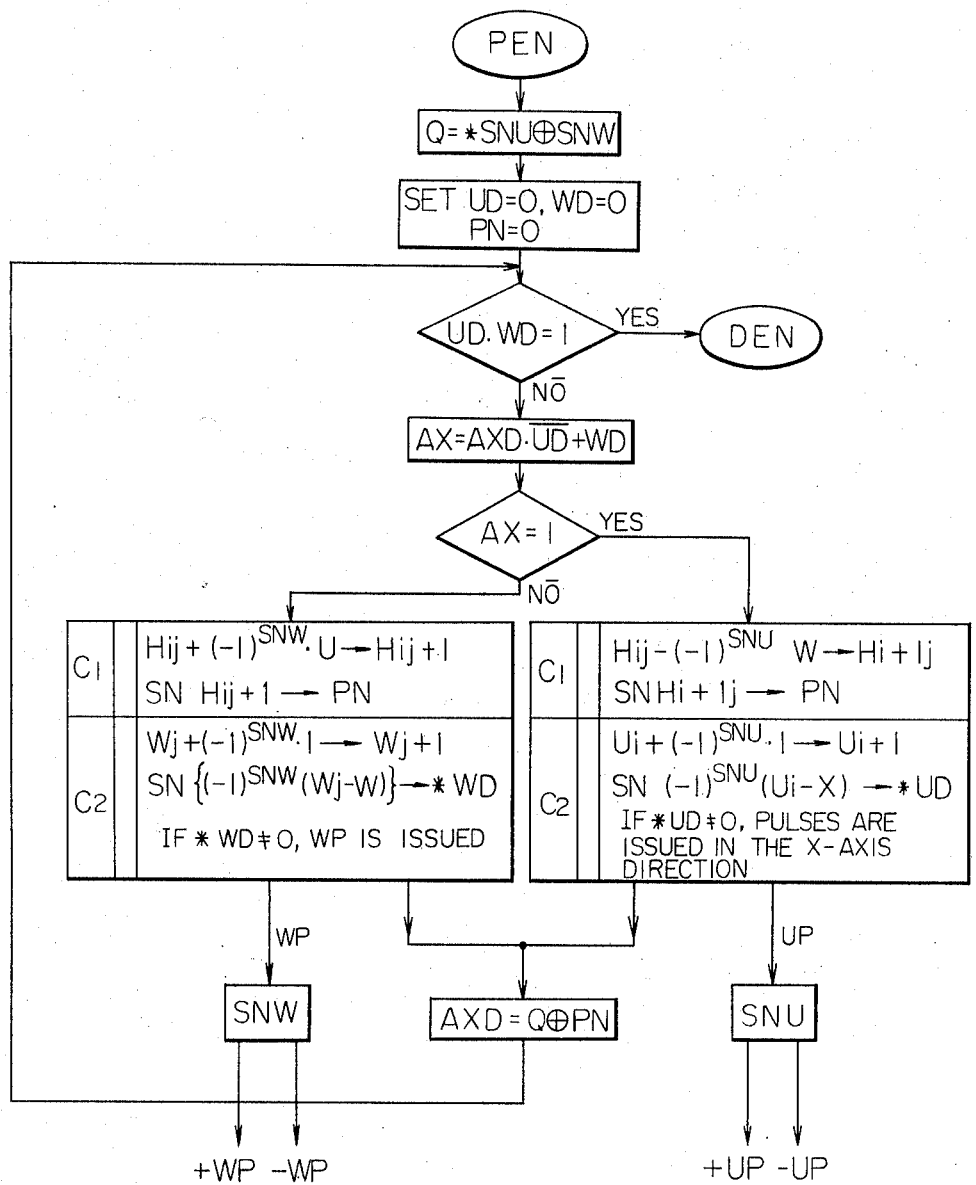
FIG. 5 is a flow chart explaining pulse distribution along a straight line.

Also, FIG. 5 is a flow chart of the pulse distribution along a straight line.

b. Pulse distribution along an arc

Figure 6:
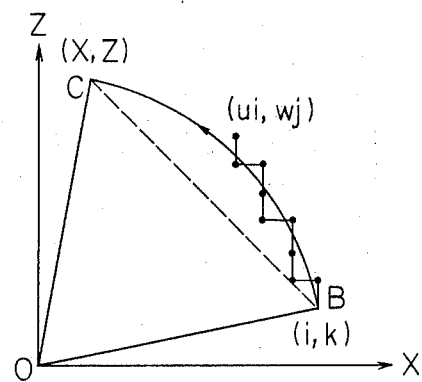
FIGS. 6, 7A and 7B are graphs explaining pulse distribution along an arc.

When the distribution along an arc is performed as shown in FIG. 6, the signs $SNU$, $SNW$ of the coordinates of an end point viewing from a start point, the values $i$, $k$ of the coordinates of the start point viewing from a center of an arc and, the values $X$, $Z$ of the coordinates of the end point viewing from the center of the arc are provided as informations resulting from the pre-processing operation.

In the graph of FIG. 6, the discrimination equation at a point $(ui, wj)$ after following by $i$ pulses in the $X$-axis direction and by $j$ pulses in the $Z$-axis direction from the start point $(i, k)$ may be expressed as follows:

$$H_{ij} = ui^2 + wj^2 - i^2 - k^2 \qquad (2)$$

Now, $PN$, $Q$ and $AXD$ are defined as follows:
 $PN = SN\ H_{ij}$
 $Q = SNU\ SNW$
 $CCW : AXD = \bar{Q}\ PN$
 $CW : AXD = Q\ PN$
In this case,
 CCW: G03 command (circular interpolation command in the counterclockwise direction)
 CW : G02 command (circular interpolation command in the clockwise direction).

The pulse distribution is performed according to the following principle.
 i. If $AXD = 0$ and $SNW = 0$, pulses are issued in $+Z$ direction.
 ii. If $AXD = 0$ and $SNW = 1$, pulses are issued in $-Z$ direction.

The accompanying computations are then, carried out as follows:

$$W_{j+1} = W_j + (-1)^{SNW} \qquad (2a)$$

$$H_{i,\ j+1} = H_{ij} + 2(-1)^{SNW} \cdot W_j + 1 \qquad (2b)$$

$(-1)^{SNW} \cdot W_j - (-1)^{SNW} \cdot Z = 0?$; If "0," the condition of $WD = 1$ is established and the flip-flop WD (refer to FIG. 16A) is set.
 iii. If $AXD = 1$ and $SNU = 0$, pulses are issued in $+X$ direction.
 iv. If $AXD = 1$ and $SNU = 1$, pulses are issued in $-X$ direction.

The accompanying computations are then carried out as follows:

$$U_i + 1 = U_i + (-1)^{SNU} \cdot 1 \qquad (2d)$$

$$H_{i+1, j} = H_{ij} + 2(-1)^{SNU} \cdot U_i + 1 \qquad (2e)$$

$(-1)^{SNU} \cdot U_i - (-1)^{SNU} \cdot X = 0?$; If "0," the condition of $UD = 1$, is established and the flip-flop $UD$ (refer to FIG. 16A) is set. $\qquad (2f)$ The above (2c) and (2f) compute to detect the end point.

When the condition of $UD \cdot WD = 1$ is obtained, DEN (DISTRIBUTION END) is set to "1" and the pulse distribution along an arc is completed.

Figure 7A:
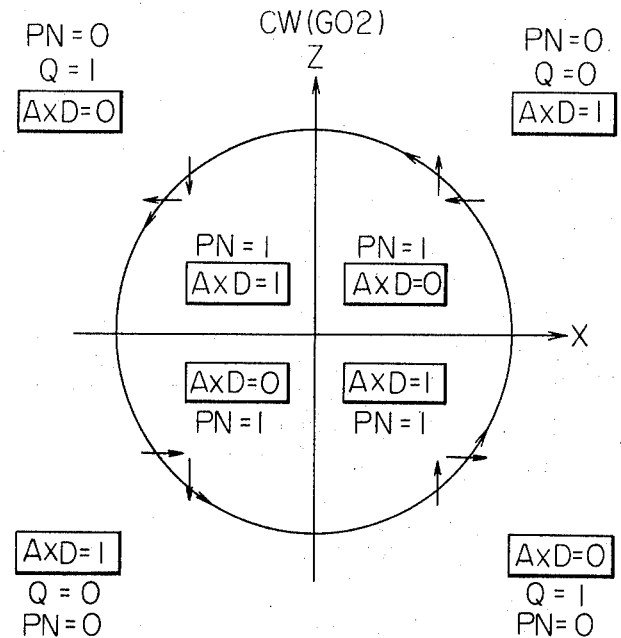
Figure 7B:
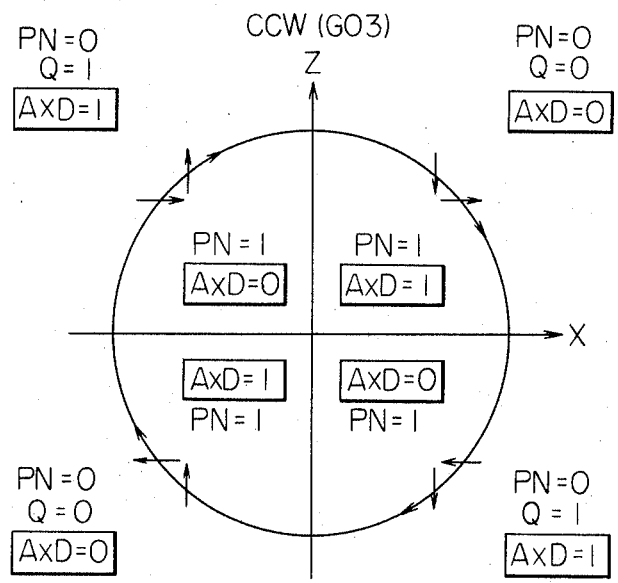

In this connection, FIGS. 7A and 7B show $Q$, $PN$, $AXD$ and the directions of the pulse distribution, respectively.

Figure 8:
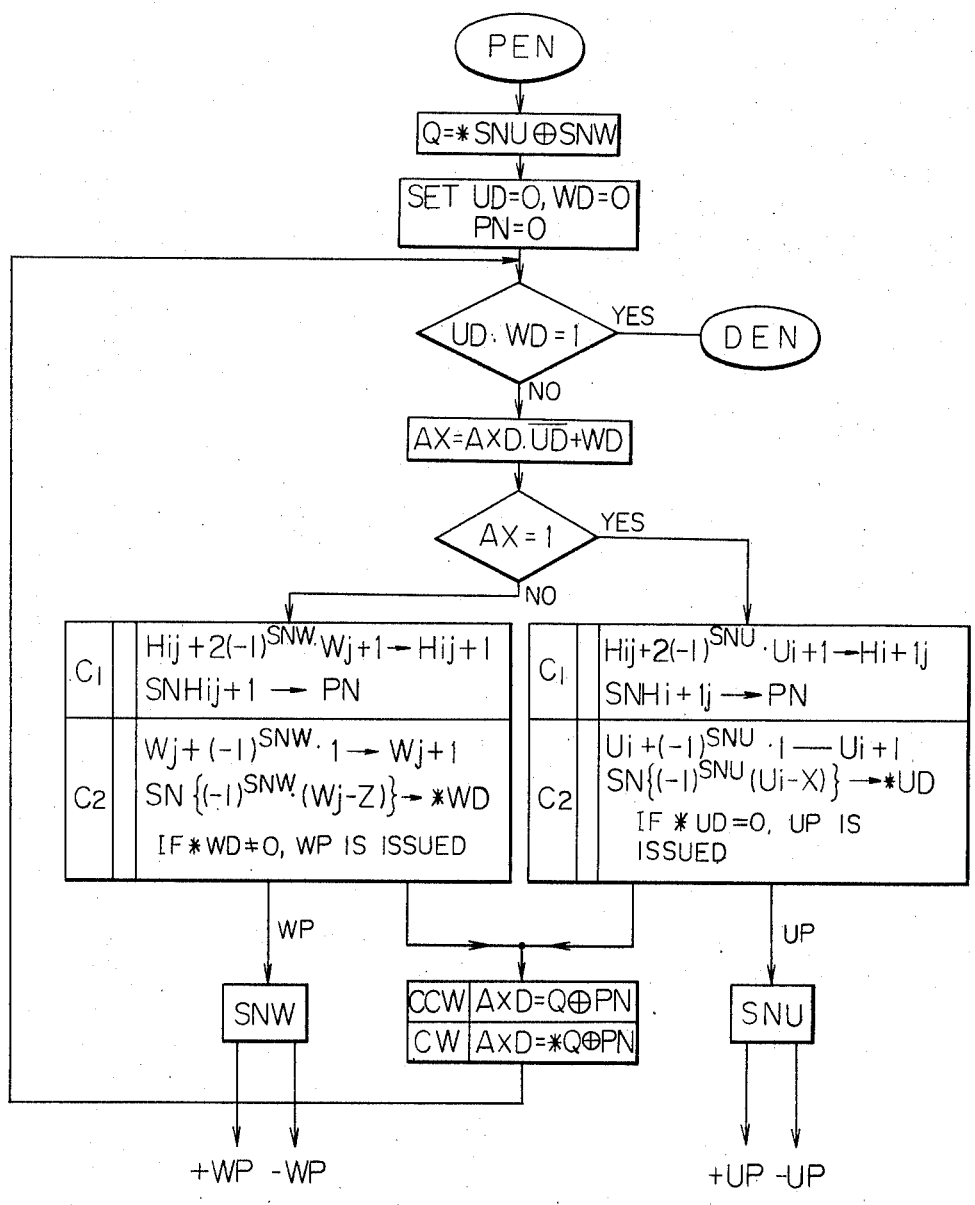
FIG. 8 is a flow chart explaining pulse distribution along an arc.

Also, FIG. 8 is a flow chart of the pulse distribution along an arc.

Referring to FIG. 9, there is shown a block diagram for showing the relationship between the read-in operation control function, pulse distribution function and the abovedescribed pre-processing operation function.

In the illustrated arrangement, the timing pulse TP from the address counter AT is impressed to the pre-processing counter PRC, read control circuit RRC, distribution circuit PDC and the arithmetic operation circuit RGT. Upon this impression of the timing pulse, the gate circuit RGD accepts the operation commands J01 to J09 from the read-in circuit RRD, the operation commands J10 to J17, J21, J32 and J24 from the pre-processing command circuit PRD and the operation commands J30 to J35 from the distribution command circuit PDD. Then, the gate signals GT01 to GT08, GT21 to GT24 of the registers R1 to R8, the gate signal GT09 of the velocity register RF, the actuating signals GT15 and GT17 for the complemental circuit C/T, the actuating signals GT13, GT14 and GT16 for the 1-bit delay circuit 1D and the actuating signal GT10 for the ±1 circuit are transferred from the gate circuit RGD to the arithmetic operation circuit RGT. The input circuit IN provides the read control circuit RRC with the sprocket signal SPL and the arithmetic operation circuit RGT with the numerical value information NI.

In addition to the above description on over-all operation of FIG. 9, the brief explanation with respect to each square block of FIG. 9 will be, hereinafter mentioned.

1. Address Counter AT

This is a $4 \times 6 =$ quaternary vigesimal counter constructed by a two phase ring counter (; a quaternary counter) and a three phase ring counter (; a senary counter) as shown in FIG. 10B and FIG. 10C, respectively. The address counter AT produces timing pulses T1 – T24 as shown in FIG. 10D and constructs one cycle by receiving 24 clock pulses as shown in FIG. 10A. As shown in FIG. 10D, the produced pulse T22, T23 and T24 are used as SB, PB and SP, respectively.

Usually, the address counter AT is reset, however, upon making read-in operation, pre-processing operation and pulse distribution operation, it begins to rotate due to clock pulses and makes registers used for the operation shift by 24 bits per one cycle so as to use the registers for read-in and for writing. FIG. 11 is an internal circuit diagram of the address counter AT.

2. Input circuit IN

This input circuit IN is provided with such functions as decoding as to whether the information read from a tape is the alphabet, numerical value, ER (End of Record), CR, —(minus sign), or /(slash sign), producing a sprocket signal SPL, decoding each alphabet, decoding each numerical value and storing each numerical value in the parallel-serial converter RN of FIG. 1 in the form of BCD (Binary Coded Decimal).

3 READ CONTROL CIRCUIT RRC

The numerical information expressed in the form of BCD on a tape is temporarily stored in the parallel-serial converter RN of the above-mentioned input circuit IN by each digit. Then the BCD information is transformed to a binary number and is stored in the register which is determined upon the basis of the alphabet preceding the numerical values. For example, the transformation from BCD to a binary number with respect to a numerical value preceded by the alphabet "X" is carried out according to the following formulae.

$(R_3) \times 4 + (R_3) \qquad R_3$
$(R_3) \times 2 + (-1)^{SNN} \cdot (RN) \qquad R_3$ In the above formulae, the operation "four bold $(\times 4)$" can be attained by passing through two 1-bit delay circuits of FIG. 1 and also, the operation "duplicate ($\times 2$)" can be attained by passing through a single 1-bit delay circuit of FIG. 1. Additionally, SNN is an output of a flip-flop which becomes a logical value "1" when the minus sign is read in and, therefore, the value of $(-1)^{SNN}$ equals "−1" when the minus sign is read in, and equals "1," when the plus sign is read in. The complement of numerical value continuing to $i$, $k$, $t_{ox}$, and $t_{oz}$ is taken when the value is positive, and resultedly, $-i$, $-k$, $-t_{ox}$, and $-t_{oz}$ are stored in the corresponding registers.

The above operation is controlled by gate signals J01 − J09 of the read in circuit RRD.

The outputs RDF1 and RDF2 of the read control circuit RRC control the operation of the above transformation from BCD to a binary number. FIG. 12 shows an embodiment of a circuit to obtain the outputs RDF1 and RDF2.

In FIG. 12, the signal ALF is a signal which becomes the logical value "1" when the alphabet with respect to the amount of displacement of a tool is read in, and keeps the logical value "1" until the subsequent alphabet is read in. The signal NUM is a signal of 1 $\tau$ (one clock width) which is issued when the numerical value is read in, and the signal SP is a signal of $1\tau$ issued from address counter AT at every 24 clock pulses. FF1 and FF2 show SR type flip-flops.

4. READ IN CIRCUIT RRD

This circuit produces a command signal for transformation from BCD to a binary number by the signals $RDF_1$ and $RDF_2$ from the read control circuit RRC and by the alphabet signal from the input circuit IN.

The logical formulae of the outputs J01 thru J09 can be shown as follows:

J01 = $RDF_1$
J02 = $RDF_2$
J03 = $XA + UA$
J04 = $ZA + WA$
J05 = $iA + t_{nx}$
J06 = $kA + t_{nz}$
J07 = $t_{nx}$
J08 = $t_{nz}$
J09 = $FA$

In the above formulae, $XA$, $UA$, $ZA$, $WA$, $iA$, $kA$, $t_{nx}$, $t_{nz}$, and $FA$ are signals which keep the logical value "1" from the time when the alphabets X, U, Z, W, $i$, $k$, $t_{nx}$, $t_{nz}$ and F are, respectively read in until the subsequent alphabets are read in.

The correspondence between J01–J09 and registers and, the operation carried out, is shown in Table 2 below.

Table 2

|  | J01 |  | J02 |  |
|---|---|---|---|---|
| J03 | $(R_3) \times 5$ | $R_3$ | $(R_3) \times 2 + (-1)^{SNN}(RN)$ | $R_3$ |
| J04 | $(R_4) \times 5$ | $R_4$ | $(R_4) \times 2 + (-1)^{SNN}(RN)$ | $R_4$ |
| J05 | $(R_5) \times 5$ | $R_5$ | $(R_5) \times 2 - (-1)^{SNN}(RN)$ | $R_5$ |
| J06 | $(R_6) \times 5$ | $R_6$ | $(R_6) \times 2 - (-1)^{SNN}(RN)$ | $R_6$ |
| J07 | $(R_7) \times 5$ | $R_7$ | $(R_7) \times 2 + (-1)^{SNN}(RN)$ | $R_7$ |
| J08 | $(R_8) \times 5$ | $R_8$ | $(R_8) \times 2 + (-1)^{SNN}(RN)$ | $R_8$ |
| J09 | $(R_F) \times 5$ | $R_F$ | $(R_F) \times 2 + (-1)^{SNN}(RN)$ | $R_F$ |

The above Table 2 indicates, for example, that when J01 together with J03 are the logical value "1," the following operation is carried out.

$(R_3) \times 5 \quad R_3$

One embodiment of the internal circuit arrangement of the read in circuit RRD is shown in FIG. 13.

5. PRE-PROCESSING COUNTER PRC

This counter is a six-phase ring counter and is usually reset in the state of PRO. When the read completion signal REN is impressed, the present state, e.g., $PR_0$ is varied to the subsequent state $PR_1$. Thereafter, the counter continues to vary its state to $PR_{11}$ every time the word end signal SP becomes the logical value "1." The shift from the state PR11 to the state PRO is carried out by distribution completion signal DEN. The correspndence between the states $PR_0$–$PR_{11}$ sit flip-flops is shown in Table 3. Also, the internal circuit arrangement of the pre-processing counter PRC is shown in FIG. 14.

Table 3

| STATE | FF1 | FF2 | FLIP-FLOP FF3 | FF4 | FF5 | FF6 |
|---|---|---|---|---|---|---|
| PRO | 0 | 0 | 0 | 0 | 0 | 0 |
| PR1 | 1 | 0 | 0 | 0 | 0 | 0 |
| PR2 | 1 | 1 | 0 | 0 | 0 | 0 |
| PR3 | 1 | 1 | 1 | 0 | 0 | 0 |
| PR4 | 1 | 1 | 1 | 1 | 0 | 0 |
| PR5 | 1 | 1 | 1 | 1 | 1 | 0 |
| PR6 | 1 | 1 | 1 | 1 | 1 | 1 |
| PR7 | 0 | 1 | 1 | 1 | 1 | 1 |
| PR8 | 0 | 0 | 1 | 1 | 1 | 1 |
| PR9 | 0 | 0 | 0 | 1 | 1 | 1 |
| PR10 | 0 | 0 | 0 | 0 | 1 | 1 |
| PR11 | 0 | 0 | 0 | 0 | 0 | 1 |

According to the above operation, each logical formula of each state PRO to PR0–PR11 is provided as follows.

$PR_0 = \overline{FF1} \cdot \overline{FF6}$ $PR_1 = FF1 \cdot \overline{FF2}$ $PR_2 = FF2 \cdot \overline{FF3}$ $PR_3 = FF3 \cdot \overline{FF4}$ $PR_4 = FF4 \cdot \overline{FF5}$ $PR_5 = FF5 \cdot \overline{FF6}$ $PR_6 = FF6 \cdot FF1$ $PR_7 = \overline{FF1} \cdot FF2$ $PR_8 = \overline{FF2} \cdot FF3$ $PR_9 = \overline{FF3} \cdot FF4$ $PR_{10} = \overline{FF4} \cdot FF5$ $PR_{11} = \overline{FF5} \cdot FF6$

6. PRE PROCESSING-COMMAND CIRCUIT PRD

This circuit produces the pre-processing operation command signals J10–J17, J23–J24. The logical formulae of respective signals are shown below.

J10 = $PR_3$
J11 = $PR_4$
J12 = $XA \cdot PR_1$
J13 = $ZA \cdot PR_2$
J14 = $PR_8 \cdot t_{nx} \cdot AR + GO2 + GO3$
J15 = $PR_9 \cdot t_{nz} AR + GO2 + GO3$
J16 = $PR_5 \cdot t_{nx} AR$
J17 = $PR_6 \cdot t_{nz} AR$
J23 = $PR_{10} \cdot GO2 \cdot GO3$
J24 = $PR_7$ In the above logical formulae, GO2 denotes a G-function (PREPARATORY FUNCTION) indicating a clockwise circular interpolation and GO3 denotes a G-function indicating a counter clockwise circular interpolation.

XAR, ZAR, $t_{nx}$AR and $t_{nz}$AR signals which keep the logical value "1" after the alphabets X, Z, $t_{nx}$ and $t_{nz}$ are read in until distribution completion signal DEN is issued. XAR and ZAR are shown in FIG. 2. The signals $t_{nx}$AR and $t_{nz}$AR can be obtained in a similar manner to the signals XAR and ZAR. The internal circuit arrangement of the pre-processing command circuit PRD is shown in FIG. 15.

7. DISTRIBUTION CIRCUIT PDC

In this distribution circuit PDC, when the signal PEN from the pre-processing counter PRC becomes the logical value "1," a flip-flop DB is set so as to begin pulse distribution operation. Other than the above flip-flop DB, this circuit includes; a flip-flop UD, indicating the completion of the pulse distribution in the X-axis direction; a flip-flop WD, indicating the completion of the pulse distribution in the Z-axis direction; a flip-flop PN, indicating whether the discrimination equation is positive or negative, that is to say, as to whether a certain point locates above or below a straight line or locates in the inside or outside of an arc, a flip-flop AX determining the axis for pulse distribution and, flip-flops $C_1$, $C_2$ which forms a distribution control counter. The distribution control counter has two states $C_1$ and $C_2$ and is started by a feed pulse FP which generates synchronously with the timing pulse T24. The detailed arrangement of the distribution circuit PDC is shown in FIGS. 16A and 16B. These FIGS. 16A and 16B will be fully understood, if reference is made to FIGS. 5 and 8. However, is a plus-minus distinguishing circuit and signal FAO is an output signal from full adder FA as shown in FIG. 1 respectively. The flip-flops DIF1, DIF2 and gate AND construct a differential circuit.

8. DISTRIBUTION COMMAND CIRCUIT PDD

This circuit produces the operation commands J30–J35 by receiving the state signals $C_1$, $C_2$ of the distribution circuit PDC, the signals AX, $\overline{AX}$ of the flip-flop AX of the distribution circuit PDC, the signal LN indicating a linear interpolation and, the signal CIR indicating a circular interpolation.

The logical formulae of the signal LN, CIR and J30–J35 are shown below.

LN = GO1
CIR = GO2 + GO3
J30 = $C_1 \cdot \overline{AX} \cdot LN$
J31 = $C_1 \cdot AX \cdot LN$
J32 = $C_1 \cdot AX \cdot CIR$
J33 = $C_1 \cdot \overline{AX} \cdot CIR$
J34 = $C_2 \cdot AX \cdot (LN + CIR)$
J35 = $C_2 \cdot \overline{AX} \cdot (LN + CIR)$ The relations between $C_1$, $C_2$, AX and J30–J35 are shown in the following Tables 4 and 5, with respect to the linear interpolation and the circular interpolation.

LINEAR INTERPOLATION

Table 4

|    |     | AX = 0 |     | AX = 1 |
|----|-----|--------|-----|--------|
| C1 | J30 | $H_{i,j}+(-1)^{SNW} \cdot U \to H_{i,j+1}$<br>$(R_7)+(-1)^{SNW} \cdot (R_3) \to R_7$ | J31 | $H_{i,j}-(-1)^{SNU} \cdot W \to$<br>$H_{i+1,j}$<br>$(R_7)-(-1)^{SNU} \cdot (R_4)$<br>$\to R_7$ |
| C2 | J35 | $wj+(-1)^{SNW} \cdot 1 = W_{j+1}$<br>$(-1)^{SNW} \cdot (wj-W)=0?$<br>$(R_6)+(-1)^{SNW} \cdot 1 \to R_6$<br>$(-1)^{SNW} \cdot (R_6)-(-1)^{SNW}$<br>$\cdot (R_4)$ | J34 | $ui+(-1)^{SNU} \cdot 1 = ui+1$<br>$(-1)^{SNU}(ui-U)=0?$<br>$(R_5)+(-1)^{SNU} \cdot 1 \to R_5$<br>$(-1)^{SNU} \cdot (R_5)-(-1)^{SNU}$<br>$\cdot (R_3)$ |

CIRCULAR INTERPOLATION

Table 5

|    |     | AX = 0 |     | AX = 1 |
|----|-----|--------|-----|--------|
| C1 | J33 | $H_{i,j}+2 \cdot (-1)^{SNW} \cdot wj+1$    $H_{i,j+1}$<br>$(R_7)+2 \cdot (-1)^{SNW} \cdot (R_6)+1$    $R_7$ | J32 | $H_{i,j}+2 \cdot (-1)^{SNU} \cdot U_i+1$<br>$H_{i+1,j}$<br>$(R_7)+2 \cdot (-1)^{SNU} \cdot (R_5)+$<br>$1$    $R_7$ |
| C2 | J35 | $wj+(-1)^{SNW} \cdot 1 = wj+1$<br>$(-1)^{SNW}(wj-Z)=0?$<br>$(R_6)+(-1)^{SNW} \cdot 1$    $R_6$<br>$(-1)^{SNW} \cdot (R_6)-(-1)^{SNW} \cdot (R_4)$ | J34 | $ui+(-1)^{SNU} \cdot 1 = ui+1$<br>$(-1)^{SNU}(ui-X)=0?$<br>$(R_5)+(-1)^{SNU} \cdot 1$    $R_5$<br>$(-1)^{SNU} \cdot (R_5)-(-1)$<br>$\cdot (R_3)$ |

9. GATE CIRCUIT RGD

This circuit produces gate signals GT01–GT24 from the signals J01–J17, J23–J24 and J30–J35, which are produced by respective decoding circuits RRD, PRD and PDD.

The correspondence between decoding signals J01–J17, J23–J24, J30–J35 and gate signal GT01–GT24 in the read-in, the pre-processing operation, the clear, and the distribution operation is shown in FIG. 19. In FIG. 19 the symbol O indicates that when operation command corresponding to the location of the symbol is in the logical value "1," the corresponding gate opens. For example, gate signal GT01 becomes the logical value "1" by receiving decoding signals J10 and J12. That is to say, the logical formula of the gate signal GT01 is provided as follows:

GT01 = J10 + J12

In FIG. 19, the symbol Δ indicates that when the suffixial signal is the logical value "1" and operation command corresponding to the location of the symbol is in the logical value "1," the corresponding gate opens.

As is explained above, the numerical control system of the present invention is capable of carrying out the numerical control action through calculation of the incremental amount on the basis of the pre-processing operation function without addition of any modification to the circuit structure even when the absolute commands and the incremental commands are mixed together at every block. Because of these operational features, the system can be accompanied with a remarkable easiness in the programming work and lessened error-making in the numerical control action. Further, it should be noted that numerical value used in the present invention can be preceded by symbols other than the alphabet also without any particular trouble caused thereby.

What we claim is:

1. A numerical control system for controlling the movement of a tool of a machine tool comprising:

a. an input circuit receptive of signals having information content representative of discrete positions to which a tool of a machine tool is to be moved, said signals being grouped in sequential blocks wherein information content of said signals comprising each of said blocks represents a plurality of command numerical values representative of said positions to which said tool is to be moved referred to an equal number of reference axes and corresponding to indications if said command numerical values correspond to incremental commands or absolute commands and includes command direction information indicating directions in which said tool is to be moved, said input circuit developing output signals having the information content of the received signals;

b. means for generating timing pulses;

c. a pre-processing counter for developing a predetermined sequence of output signals in response to said timing pulses applied thereto and in response to a signal applied thereto indicating a block of said received signals were received by said input circuit;

d. means for applying said timing pulses to said pre-processing counter;

e. means for generating and applying to said pre-processing counter said signal indicating a block of said received signals were received by said input circuit;

f. a gate circuit for developing gate signals in response to read command signals and operation command signals applied thereto;

g. read circuit means receptive of said input circuit output signals for developing and applying said read command signals applied to said gate circuit;

h. pre-processing command circuit means receptive of said pre-processing counter output signals for developing in response thereto said operation command signals and for applying said operation command signals to said gate circuit;

i. an arithmetic operation circuit comprising a plurality of registers for storing position information of said tool referred to said reference axes and said command numerical values, said arithmetic operation circuit comprising means for simultaneously converting said command numerical values which are absolute commands into equivalent incremental commands and replacing said absolute commands stored in said registers with said equivalent incremental commands, and computing position information of a subsequent position of said tool from said position information stored in said registers and from said incremental commands and replacing said position information with said subsequent position information in response to said gate signals;

j. means for applying said input circuit output signals and said gate signals to said arithmetic operation circuit;

k. pulse distribution circuit means for developing and applying pulse distribution control signals to said gate circuit in response to said timing pulses and one of said pre-processing counter output signals applied thereto, said gate circuit developing and applying gate signals to said arithmetic operation circuit in response to said pulse distribution control signals, said arithmetic operation circuit applying said incremental commands to means for positioning said tool in response to said last-mentioned gate signals, said pulse distribution circuit means comprising means for developing and applying a signal to clear and reset said pre-processing counter after said incremental commands are applied to said means for positioning said tool; and l. means for applying said timing pulses and one of said pre-processing counter output signals to said pulse distribution circuit.

2. A numerical control system for controlling the movement of a tool of a machine tool according to claim 1 wherein said pre-processing counter comprises a plurality of flip-flops in cascade.

3. A numerical control system for controlling the movement of a tool of a machine tool according to claim 1 wherein said input circuit comprises means for receiving said received signals and said received signals having information content indicating if said command numerical values correspond to incremental commands or absolute commands correspond to selected alphabetic letters.

* * * * *